US007509208B2

(12) United States Patent
Bays

(10) Patent No.: US 7,509,208 B2

(45) Date of Patent: Mar. 24, 2009

(54) SYSTEM AND METHOD FOR PROVIDING COOLING PROTECTION FOR AN ENGINE

(75) Inventor: Mark Bays, Columbus, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 0 days.

(21) Appl. No.: 11/292,618

(22) Filed: Dec. 2, 2005

(65) Prior Publication Data

US 2007/0129874 A1 Jun. 7, 2007

(51) Int. Cl.

| | |
|---|---|
| ***G06F 19/00*** | (2006.01) |
| ***F01P 7/02*** | (2006.01) |
| ***F01P 5/10*** | (2006.01) |
| ***F01P 7/10*** | (2006.01) |

(52) U.S. Cl. ................. 701/102; 123/41.12; 123/41.44; 123/41.49

(58) Field of Classification Search ................. 701/102, 701/103, 104, 111, 114, 115; 73/35.03, 35.06, 73/35.08, 35.09, 117.1, 117.3, 118.1; 123/339.22, 123/339.29, 339.24, 339.25, 41.05, 41.1, 123/41.43, 41.49, 339.18

See application file for complete search history.

(56) References Cited

U.S. PATENT DOCUMENTS

| | | | | |
|---|---|---|---|---|
| 4,721,083 | A * | 1/1988 | Hosaka | 477/111 |
| 5,245,966 | A * | 9/1993 | Zhang et al. | 123/339.19 |
| 5,769,049 | A * | 6/1998 | Nytomt et al. | 123/435 |
| 5,809,437 | A * | 9/1998 | Breed | 701/29 |
| 6,085,142 | A * | 7/2000 | Di Leo et al. | 701/104 |

* cited by examiner

*Primary Examiner*—Willis R. Wolfe, Jr.
*Assistant Examiner*—Johnny H. Hoang
(74) *Attorney, Agent, or Firm*—Sawyer Law Group LLP

(57) ABSTRACT

A method and system for controlling the temperature of an engine system is disclosed. The method and system comprise measuring a coolant temperature of the engine system; measuring noise factors of the engine system; and controlling components of the engine system to provide for an optimal operation of the engine based upon the measured temperature and measured noise factors. Accordingly, a system and method in accordance with the present invention combines measuring noise factors such as coolant pressure or coolant concentration and the temperature and then adjusting the threshold values for factors such as fan on temperature and engine protection derate. In so doing the coolant temperature can be controlled within an acceptable range of values.

19 Claims, 3 Drawing Sheets

100

100

SYSTEM AND METHOD FOR PROVIDING COOLING PROTECTION FOR AN ENGINE

FIELD OF THE INVENTION

The present invention relates generally to engines and more specifically to a method and system for cooling an engine.

BACKGROUND OF THE INVENTION

The combination of lower, more aerodynamic vehicle hood lines and increased heat rejection from diesel engines due to improved emission control devices results in ever increasing difficulty in cooling system design. One tactic is to increase the maximum allowable coolant temperature in the engine to increase the heat transfer capability of a given size radiator. However, excessive coolant temperature can result in engine component failure due to boiling. Current engines use electronic controls to measure the coolant temperature and take steps such as turning on the fan or decreasing the power output when the temperature is too high. The goal of these schemes is to keep the coolant under a particular temperature. The common practice today is to use fixed temperature values as set points for this type of control scheme. Fan events and derates for the engine happen at pre-programmed temperatures selected with the goal of keeping the coolant temperature in a pre-selected range.

However, there are several noise factors that can not be accounted for using a single set of temperature values. Coolant pressure is perhaps the biggest noise factor, but there are many other factors that can not be accounted for. For example, if the temperature is high while the pressure is low, there is risk of boiling in the head, EGR cooler or water pump seal cavity. The pressure in the cooling system is regulated by a pressure cap and top tank system and is also a function of altitude.

The cap and top tank are supplied by the vehicle OEM rather than the manufacturer, so there is a large amount of variation in their performance and the same vehicle may operate at many different altitudes. An engine manufacturer is faced with making a trade-off—risking engine damage by selecting temperature set points that are too high, or risking being uncompetitive by setting our temperature limits too low, resulting in OEM dissatisfaction and excessive derates for the end user. Among the considerations that go into the selection of set points is estimating what would happen at the extremes of variation of unknowns such as coolant pressure.

The result is typically a trade off where compromises are made both in engine reliability and in radiator size. Accordingly, what is needed is a system and method for minimizing this trade off. The method and system should be cost effective, easy to implement and adaptable to existing engines. The present invention addresses such a need.

SUMMARY OF THE INVENTION

A method and system for controlling the temperature of an engine system is disclosed. The method and system comprise measuring a coolant temperature of the engine system; measuring noise factors of the engine system; and controlling components of the engine system to provide for an optimal operation of the engine based upon the measured temperature and measured noise factors.

Accordingly, a system and method in accordance with the present invention combines measuring noise factors such as coolant pressure or coolant concentration and the temperature and then adjusting the threshold values for factors such as fan on temperature and engine protection derate. In so doing the coolant temperature can be controlled within an acceptable range of values.

DETAILED DESCRIPTION

The present invention relates generally to engines and more specifically to a method and system for cooling an engine. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A control system algorithm is utilized that protects the engine from damage due to excessive coolant temperature in conditions where that would be a problem. Instead of the control algorithm operating in the traditional way, that is, if the temperature crosses some fixed threshold, the power is reduced to keep parts of the engine, for example, from overheating, a system and method in accordance with the present invention also measures noise factors, such as the pressure in the engine coolant, chemical make up of the engine coolant and the like. Therefore the engine can operate in conditions that otherwise might be inappropriate because there would be risks associated with operating it. For example, the engine can run hotter, which is an advantage because then a smaller radiator could be utilized. To describe the features of the present invention in more detail refer now to the following discussion in conjunction with the accompanying figures.

Figure 1:
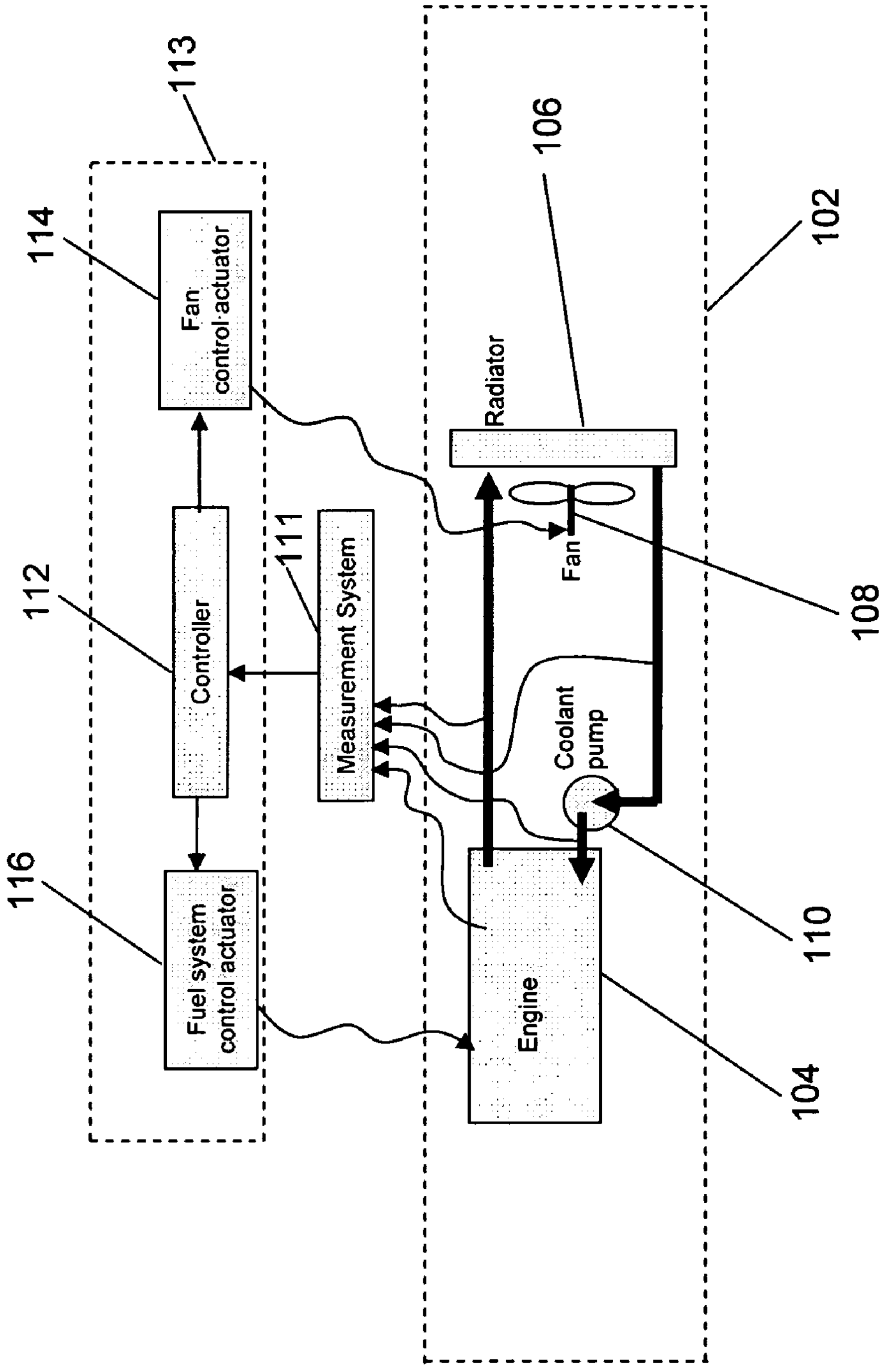
FIG. 1 is a diagram of an engine system in accordance with the present invention.

FIG. 1 is a diagram of a system 100 in accordance with the present invention. The system 100 includes an engine system 102. The engine system 102 comprises an engine 104, a radiator 106, a fan 108, and a coolant pump 110. The system 100 also includes a measurement system 111 that measures the temperature of the coolant and pressure at any of various locations such as at the point where the coolant flows from the engine 104 to the radiator 106, at the point where the coolant flows to the coolant pump 110 from the radiator 106, and at the point where the coolant leaves the coolant pump 108 to return to the engine 104. The system 100 also includes a controller system 113. The control system 113 includes a controller 112 which controls a fuel system actuator 116 or other actuator affecting engine performance and heat rejection and fan control actuator 114 based upon the measurement system. Depending on the measurements taken by the measurement system 110, and standards set for most efficient operation at the highest safe temperature possible, the controller 112 issues commands to the fan control actuator 114 to turn off or on the fan 108, and to the fuel system control actuator 116 to adjust the fuel system.

Figure 2:
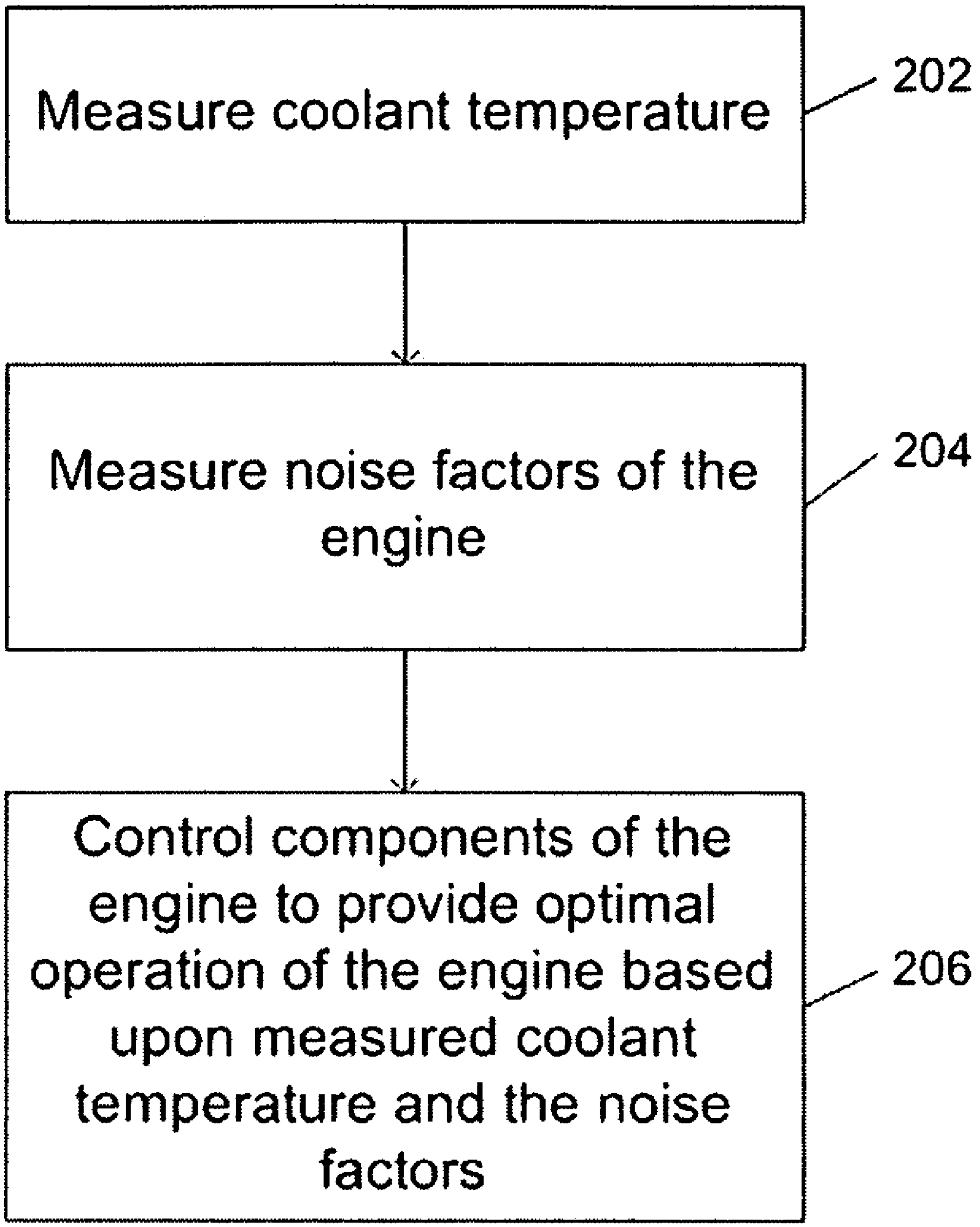
FIG. 2 is a simple flow chart of the algorithm for controlling the engine temperature in accordance with the present invention.

In a preferred embodiment, the control system includes a microcontroller which utilizes a memory and a new control algorithm to adjust the temperature set points. FIG. 2 is a simple flow chart of the algorithm for controlling the engine temperature in accordance with the present invention. Accordingly, referring to FIG. 2, first a coolant temperature is measured, via step 202. Then, the noise factors of the engine are measured, via step 204. Finally, components of the engine are controlled to provide optimal operation of the engine based upon measured coolant temperatures and the noise factors, via step 206.

Figure 3:
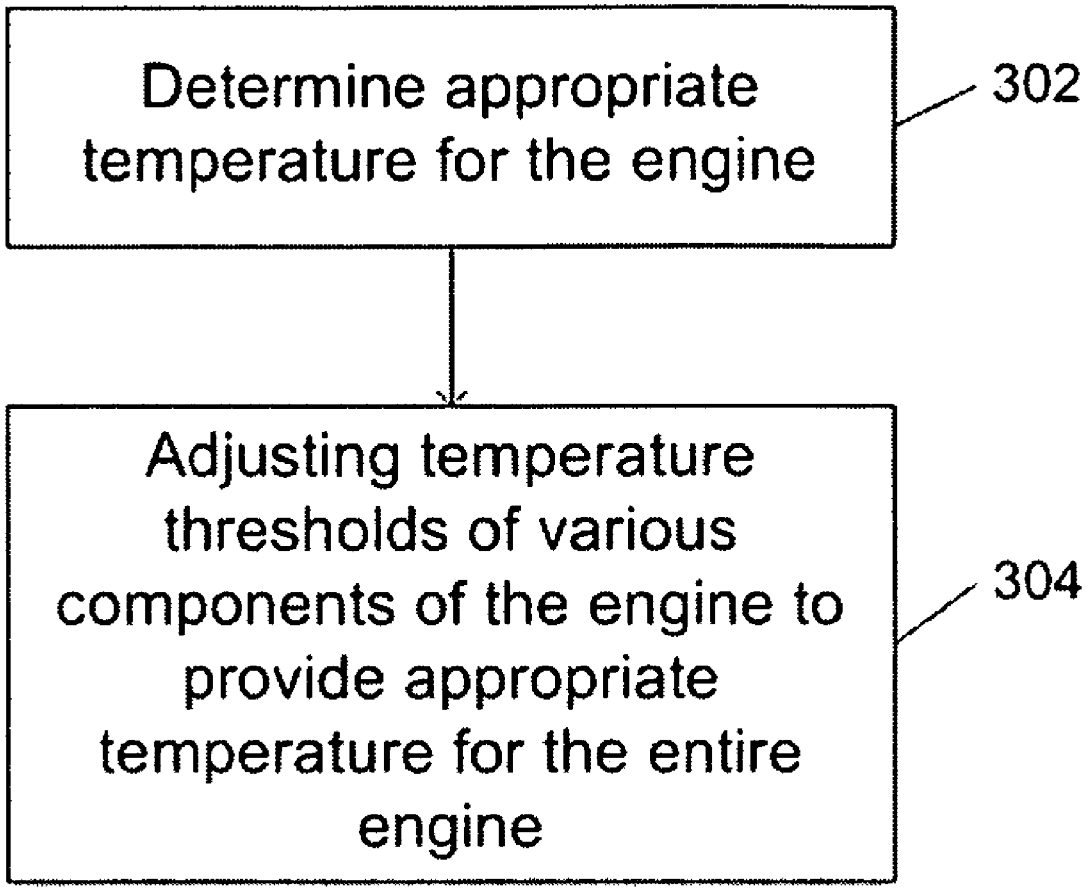
FIG. 3 is a flow chart showing how the engine temperature is set in accordance with the present invention.

FIG. 3 is a flow chart showing how the engine temperature is set (step 206) in accordance with the present invention. Referring to FIG. 3, first the appropriate temperature is determined, via step 302. Then the temperature threshold is adjusted to provide appropriate temperature, via step 304. In a preferred embodiment, the control system might use pre-tabulated values to determine when a lower threshold is required and what threshold is appropriate for the measured conditions. In another embodiment, the control system would calculate a maximum threshold temperature based on physical relationships for phenomena such as boiling. By using the measured values to adjust the temperature thresholds, the impact to the end user is minimized because action is only taken when the engine becomes hot enough to cause damage. In a typical situation, fan and heat rejection reduction obtained by control of engine performance parameters would combine to prevent the coolant temperature from increasing beyond the desirable value. At the same time, the derate is not so severe that the problem would be mission disabling.

Accordingly, a system and method in accordance with the present invention reduces the number of unknowns by directly measuring the noise factors during engine operation and adjusting temperature set points accordingly.

The reliability of the engine components designed for a higher peak operating temperature is improved by using an electronic control system that measures noise factors and temperatures and makes corresponding adjustments to the engine derate threshold temperatures. Primary examples of noise factors include operating pressure and coolant concentration. If these noise factors are measured by the electronic control system it is possible to operate the engine with higher temperature threshold values for normal operation, but to lower the threshold values when the control system detects that the measured conditions could lead to engine damage.

Accordingly, a control system algorithm in accordance with the present invention is utilized that protects the engine from damage due to excessive coolant temperature in conditions where that would be a problem. In this algorithm noise factors, such as the pressure in the coolant, coolant composition and the like are measured in addition to the temperature. Therefore the engine can operate in conditions that otherwise might be inappropriate because there would be risks associated with operating it.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a temperature of an engine system comprising:

measuring a coolant temperature of the engine system;

measuring noise factors of the engine system; and controlling a plurality of components of the engine system to provide for an optimal operation of the engine based upon the measured temperature and measured noise factors.

2. The method of claim 1 wherein the plurality of components of the engine system comprise an engine; a coolant pump coupled to the engine and a radiator coupled to the coolant pump and the engine, a fan for cooling the radiator, and actuators for controlling performance of the engine.

3. The method of claim 2 wherein a fan and performance actuators of the engine are controlled to provide the optimal operation of the engine system.

4. The method of claim 1 wherein the controlling is provided by adjusting temperature thresholds of the plurality of components.

5. The method of claim 4 wherein pre-tabulated values are utilized to determine the threshold that is appropriate for the measured condition.

6. The method of claim 4 wherein the threshold is calculated based on a physical relationship of a phenomena.

7. A computer readable medium encoded with a program containing program instructions for controlling a temperature of an engine system comprising:

measuring a coolant temperature of the engine system;

measuring noise factors of the engine system; and controlling a plurality of components of the engine system to provide for an optimal operation of the engine based upon the measured temperature and measured noise factors.

8. The computer readable medium of claim 7 wherein a plurality of components of the engine system comprise an engine; a coolant pump coupled to the engine and a radiator coupled to the coolant pump and the engine and a fan for cooling the radiator.

9. The computer readable medium of claim 8 wherein a fan and a performance actuators of the engine are controlled to provide the optimal operation of the engine system.

10. The computer readable medium of claim 7 wherein the controlling is provided by adjusting temperature thresholds of the plurality of components.

11. The computer readable medium of claim 10 wherein pre-tabulated values are utilized to determine the threshold that is appropriate for the measured condition.

12. The computer readable medium of claim 10 wherein the threshold is calculated based on a physical relationship of a phenomena.

13. A system comprising:

an engine system;

a measurement system for measuring coolant temperature of the engine system and noise factors of the engine system; and a control system coupled to the measurement system and the engine system, the control system for controlling a plurality of components of the engine system to provide for an optimal operation of the engine system based upon the measured temperature and the measured noise factors.

14. The system of claim 13 wherein the plurality of components of the engine system comprise an engine; a coolant pump coupled to the engine and a radiator coupled to the coolant pump and the engine and a fan cooling the radiator.

15. The system of claim 14 wherein the control system comprises:

a performance modifying actuator is coupled to the engine;

a fan control actuator coupled to the fan; and a controller coupled to the measurement system, the performance modifying actuators and the fan control actuator.

16. The system of claim 15 wherein the fan and the performance modifying actuators of the engine are controlled to provide the optimal operation of the engine system.

17. The system of claim 16 wherein the control system adjusts temperature thresholds of the plurality of components.

18. The system of claim 17 wherein pre-tabulated values are utilized to determine the threshold that is appropriate for the measured condition.

19. The system of claim 13 wherein the threshold is calculated based on a physical relationship of a phenomena.

* * * * *